Jan. 31, 1933. B. M. FRANK ET AL Re. 18,725
BED STRUCTURE
Original Filed May 4, 1929 3 Sheets-Sheet 1
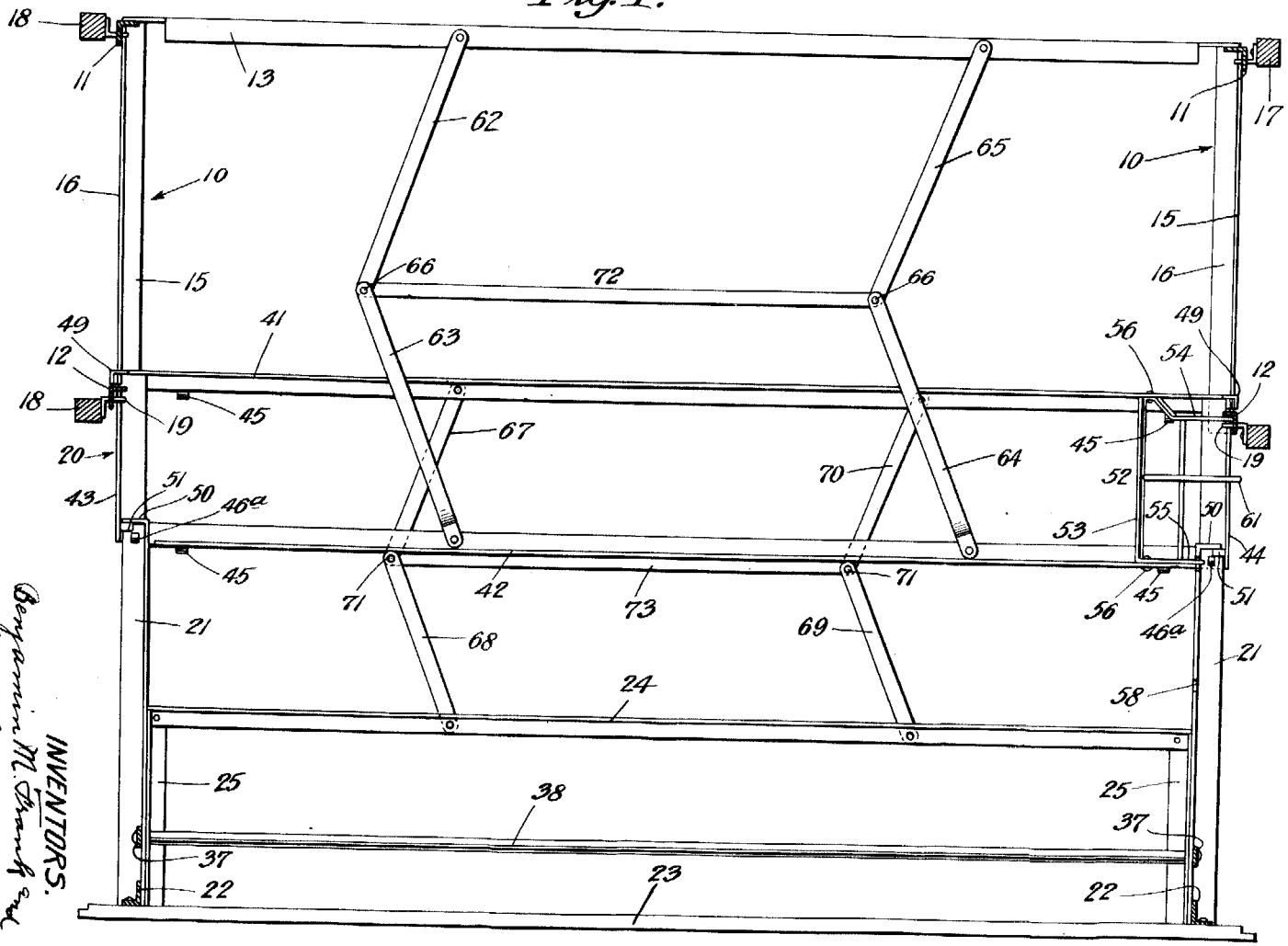
INVENTORS.
Benjamin M. Frank and
Joseph Basile
By Geo. L. Wheelock
Attorney Jan. 31, 1933. B. M. FRANK ET AL Re. 18,725
BED STRUCTURE
Original Filed May 4, 1929 3 Sheets-Sheet 2
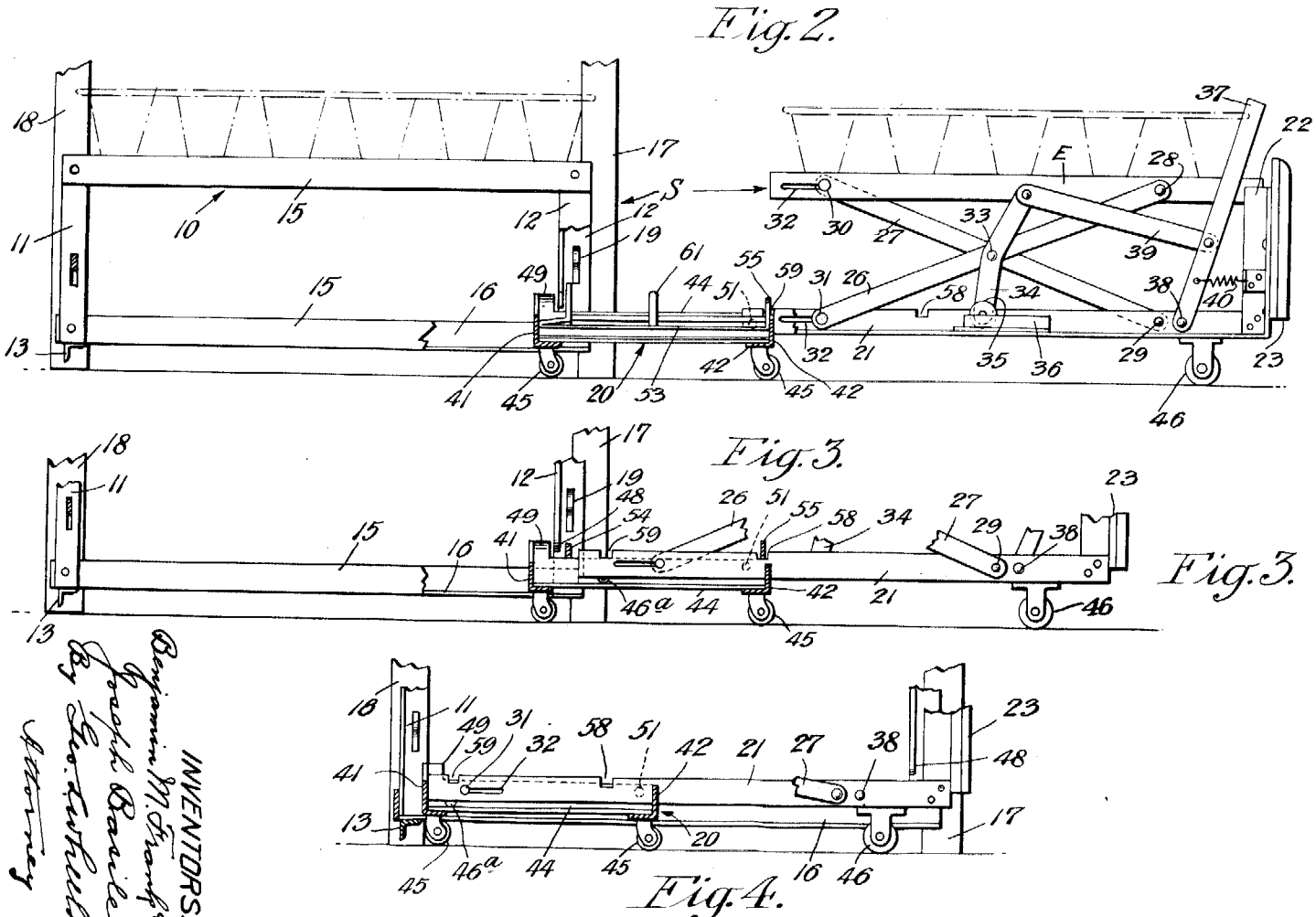
INVENTORS.
Benjamin M. Frank
Joseph Basile
By Geo. L. Wheelock
Attorney Jan. 31, 1933. B. M. FRANK ET AL Re. 18,725
BED STRUCTURE
Original Filed May 4, 1929 3 Sheets-Sheet 3
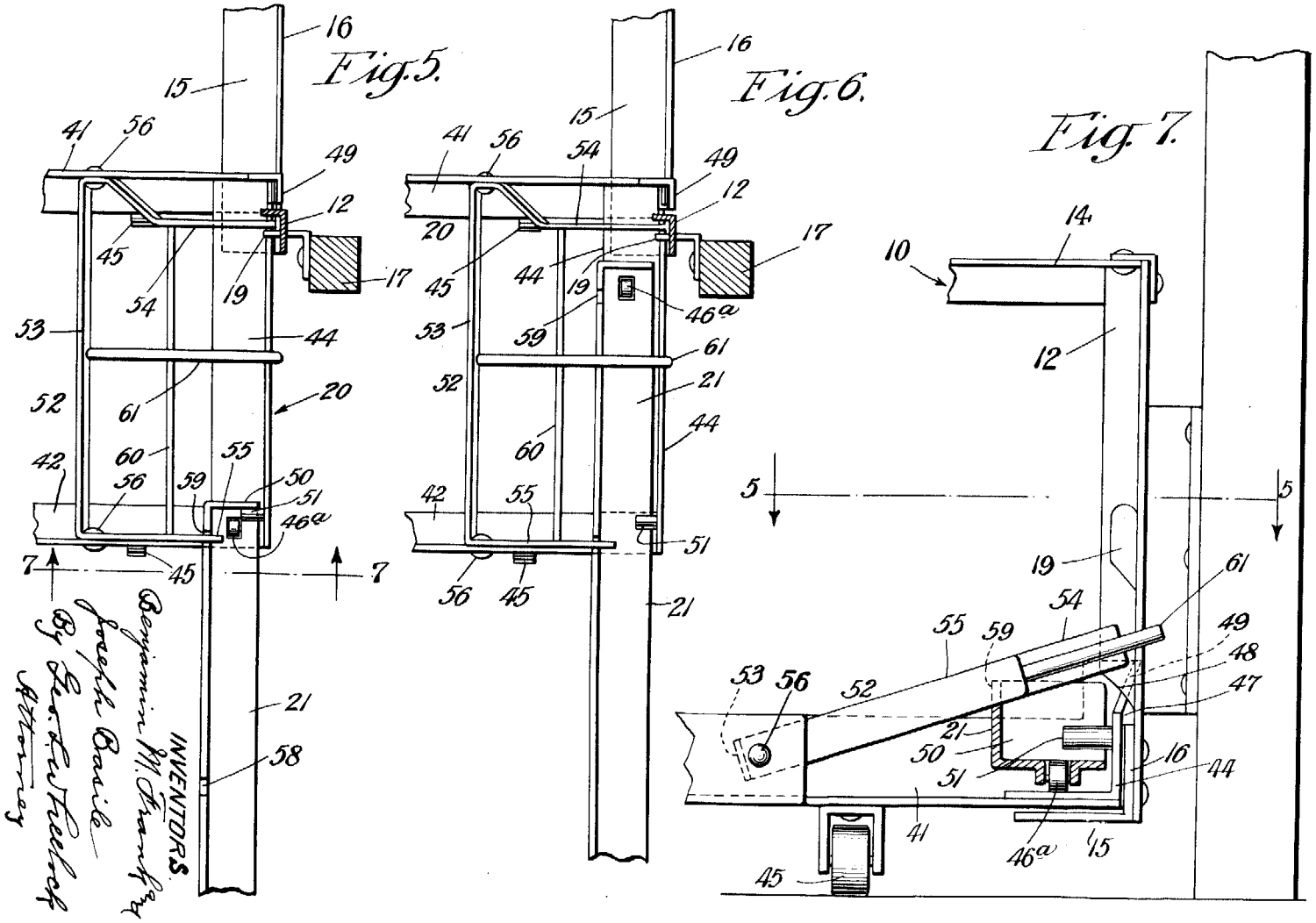
INVENTORS.
Benjamin M. Frank 2nd
Joseph Basile
By Geo. L. Wheelock
Attorney Reissued Jan. 31, 1933

Re. 18,725

UNITED STATES PATENT OFFICE

BENJAMIN M. FRANK AND JOSEPH BASILE, OF NEW YORK, N. Y., ASSIGNORS TO GREENPOINT METALLIC BED CO., INC., OF BROOKLYN, NEW YORK, A CORPORATION OF NEW YORK

BED STRUCTURE

Original No. 1,820,658, dated August 25, 1931, Serial No. 360,388, filed May 4, 1929. Application for reissue filed January 6, 1932. Serial No. 585,132.

This invention relates to bed structures of the type which is convertible into a double bed or into spaced or isolated twin beds, or in which a single bed may be used for a sofa or couch, and wherein two bed frames or sections are employed, one of which constitutes a slidable bed section which may go alongside of the other one, and both may be incorporated in the sofa or couch.

An object of the present invention is to provide such a bed structure as may be converted easily and quickly from a sofa or couch into twin beds, that is two single beds amply spaced apart alongside of each other, or into a double bed wherein the two bed sections are not appreciably spaced apart if at all and to provide a simple and efficient structure for such purposes.

An object of the present invention also is to provide a sofa or couch day bed, including two bed frames or sections, one of which may be placed in a plurality of positions for use with the other, as a double bed or as substantially spaced apart twin beds, and one of which may constitute a frame or bed section which is finished and upholstered so as to present the appearance of a sofa or couch, and one of which, notwithstanding the possibility of conversion of both of the bed frames for use as a double bed or as twin beds, may be connected with the other bed frame by suitable relatively movable means enabling such one of the bed frames to be slid to single bed position, in which position both of the bed frames will be telescoped or nested so as to form the sofa or couch, the slidable bed frame being provided with a front board or valence to complete the finish of the sofa or couch when the two frames are thus telescoped or nested together.

Another object of the invention is to provide a sofa or couch day-bed wherein a slidable, bed section or frame may be placed in a plurality of positions for use with another bed frame or section, and wherein, notwithstanding the possible different using positions of one of the frames, the same with the bodily shiftable mechanism which connects it with the other bed frame forming the sofa or couch may be slid in underneath the springs and mattress of the sofa or couch and if desired be entirely concealed from view, except for the front board or valence which finishes the outer side of the slidable bed frame.

Another object of the invention is to provide means for converting a couch day-bed into spaced twin beds, the spacing being such as to almost completely and entirely isolate one of the twin sections from the other bed section as if they were entirely separated and disconnected units or beds, and in effect such isolation is true except for the connecting means or mechanism which preferably lies low towards the floor so that the space separating the twin sections is sufficiently free and ample for enabling the separate making up of the twin bed sections with bed clothing, pillows and so forth just as if they were absolutely isolated and entirely separate bed sections or twin beds.

Another object of the invention is to provide an intermediate frame or carriage between the main bed frame and the auxiliary sliding bed frame, and which may be provided with casters similar to casters which are preferably used on the sliding bed section, such frame or carriage and concomitant locking and other parts being simple and efficient in operation.

Another object of the invention is to make it possible to utilize in couch day beds such as mentioned, certain improvements in the art shown, described and claimed in pending application of Benjamin M. Frank and Joseph Basile, Serial No. 233,099, filed on January 17, 1929.

These being among the objects of the present invention, the same consists of certain features of construction and combinations of parts to be hereinafter described and then claimed with reference to the accompanying drawings, illustrating a preferred embodiment of the invention and wherein Figure 1 is a sectional plan view of the structure, showing the extension or auxiliary bed frame moved out as far as possible in order to convert the structure into spaced twin beds;

Fig. 2 is a sectional side elevation thereof wherein are indicated in broken lines the springs for supporting the mattresses and bedding and also showing means for elevating the top section of the auxiliary bed frame, the parts shown in common with Fig. 1 being in the same position as in Fig. 1;

Fig. 3 is a somewhat similar view to Fig. 2, parts being omitted and the extension or sliding bed frame being shown as moved inwardly towards the main frame, whereby the bed structure is converted into a double bed with no space between them;

Fig. 4 is a view showing similar parts to Fig. 3, the carriage or intermediate frame and the sliding or extension bed frame being shown as slid together within the main bed frame and the latching or locking device being omitted;

Fig. 5 is an enlarged sectional detail view of parts, including the locking means, shown in Fig. 1, and in the same position as in Fig. 1, the section being on line 5—5 of Fig. 7;

Fig. 6 is a view similar to Fig. 5, except that the sliding bed frame is shown as moved to the inward position shown in Fig. 3; and Fig. 7 is an enlarged sectional detail on the line 7—7 of Fig 5.

Referring to the drawings, the main frame 10 is constructed similarly to that shown in aforesaid application Serial No. 333,099. Briefly the main frame comprises rear uprights 11, front uprights 12, back bars 13, top front bar 14 (see Fig. 7) and parallel end bars 15, all formed of angle metal and constituting the frame of the sofa or couch section of the bed structure. The end bars 15 provide vertical guide flanges 16. The bed ends 17, 18 are supplied as usual for imparting with the assistance of other usual well known parts, the appearance of a couch or sofa when the entire structure is converted into use for that purpose, such ends being, as is well known, usually in the form of boards with corner posts provided with hooks 19 for entering corresponding slots in the main frame so as to properly support the same and the members carried by it.

Suitably connected with the frame 10 are bars which are relatively movable to both bed frames, and which may form parts of an intermediate sliding frame or carriage 20, to be later described in detail, and with which is associated the extension bed frame. The latter comprises a bottom or sliding frame, with end bars 21, upright front bars 22 and a front board, closure or valence 23. The end bars 21 may be connected by a brace bar 24 in order to more surely hold them parallel with the end bars 15 of the main frame 10, said brace bar being attached to the inwardly extending flanges of angle bars 25 on the end bars 21. Bars 25 are suitably fixed firmly to bars 21. The bottom frame of one of the bed frames which may be the auxiliary or extensible portion of the bed structure is provided with collapsible raising and lowering mechanism for the elevating bed or mattress section E, which is constructed preferably as disclosed in said application No. 333,099.

The frame or bed section formed by the upper bars 14 and 15 and the elevating frame or bed-section E are provided with suitable bed bottoms on which two mattresses or the like may rest. In Fig. 2 the bed bottoms are indicated in dotted lines as being formed of the usual coil springs connected with the usual border wires at the tops of the springs, such springs being supported in the well known manner by bars or members transverse of the said frames.

The raising and lowering mechanism comprises a pair of connecting bars 26, 27, the front ends of said bars being connected by pivots 28, 29 respectively with one end of the spring and the mattress section E and one of the end bars 21 of the bottom sliding frame. The rear ends of the bars 26, 27 are respectively connected by pivot pins 30, 31 with the same end of the mattress section E and the same one of the end bars 21, said pins being located in slots 32 thereof. The connecting bars 26, 27 are crossed and at the point of crossing are connected by a pivot 33. It will be understood that similar crossed bars and parts are at both ends of the auxiliary bed frame.

A lifting lever 34 is mounted on the pivot 33 and carries a roller 35 for traveling on the end rails or bars 21 of the auxiliary or extension frame. A guard flange 36 is fixed to the end bar 21 to confine the roller 35 to the horizontal flange of the said end bar, on which it travels. A hand lever 37 is pivoted at 38 to an end bar 21, such pivot being in the form of a rotary shaft to which lever 37 is fixed and which extends as shown in Fig. 1 to the other end of the sliding bottom frame, where similar mechanism to that described is preferably provided. Said hand lever is pivotally connected by means of a link 39 with the lifting lever 34 for operating the latter.

When the auxiliary bed frame is collapsed it may be stored in the space provided within the main bed frame 10, and it is obvious that by properly moving the hand lever 37, when the auxiliary bed frame is slid out so as to clear the main frame, that the spring and mattress section E may be raised to the position shown in Fig. 2, in which position it is held by reason of the roller on lifting lever 34 having passed beyond a vertical line through the pivot 33. By moving the hand lever 37 in the opposite direction the section E may be lowered and the entire auxiliary bed frame moved back into the space within the main frame 10. A spring 40 is provided which tends to throw the hand lever 37 forwardly when the roller 35 passes forward of the vertical line through pivot 33, thus assisting the operator in raising the auxiliary bed frame.

The intermediate frame or carriage 20 before mentioned is for the purpose of enabling one of the bed frames which may be the auxiliary bed frame to be moved out beyond the main bed frame sufficiently to provide an ample space S (Fig. 2), so that the improved bed structure may be converted from a sofa or couch day bed into twin beds, or from a double bed, in which the two bed frames directly adjoin each other, into twin beds. The intermediate frame or carriage 20 preferably comprises parallel longitudinal bars 41, 42 and parallel end bars 43, 44 rigidly connected therewith, and these bars being preferably composed of angle metal. This carriage is provided with casters 45 for rolling upon the floor and supporting said carriage between the vertical flanges of the lower end bars 15 of the main frame 10. The length of the intermediate frame or carriage 20 is a trifle less than the distance between the vertical flanges of the lower end rails 15, and the said carriage may be partially supported by the horizontal flanges 16 of said end bars, or it may entirely clear said flanges if it be desired to support the entire weight of the carriage and adjacent parts from the floor. Preferably the front portion of the auxiliary bed frame is supported by casters 46 which are mounted on the end bars 21 thereof, while the said end bars 21 are supported upon the horizontal flanges of the end bars 43, 44 of the intermediate frame or carriage, the distance between the outer edges of the end bars 21 being slightly less than the distance between the vertical flanges of the end bars 43, 44, so that the bottom portion of the auxiliary bed frame may slide between said vertical flanges. At the inner ends of the end bars 21, rollers 46*a* are preferably mounted for furnishing a rolling contact between said end bars and the horizontal flanges of the end bars 43, 44.

The lower portions of the inwardly directed flanges of the front upright bars 12 of the main bed frame are cut away to provide cut out portions or recesses 47 as clearly shown in Fig. 7, so that the vertical flanges of the end bars 43, 44 may be located as close as possible to the adjacent parts of the main frame 10. These cut outs 47 are for another purpose, which is to enable the provision of abutment portions 48 at the top of the cut-outs, such abutment portions being furnished by the lower ends of the inwardly directed flanges of the front uprights 12 as shown in Fig. 7. Stops 49 are provided at each end of the rear longitudinal bar 41 of the intermediate frame 20 as shown in Figs. 5, 6 and 7 for the purpose of striking against the abutment portions 48 when the intermediate frame 20 is pulled out as far as possible. Stops 50 are provided at the inner ends of the end bars 21 and these are adapted to strike against inwardly projecting abutment pins 51 when the end bars 21 are pulled out as far as possible, such abutment pins being fixed to the forward ends of the vertical flanges of the end bars 43, 44 of the intermediate frame or carriage, as shown in Figs. 1 and 5.

Locking means 52 are provided, preferably only at one end of the improved bed structure, for the purpose of securing the auxiliary bed frame in fixed relation with respect to the intermediate frame or carriage 20. Such locking means preferably comprises a cross-bar 53 which is formed at the ends with outwardly directed latch arms 54, 55, the arm 55 being somewhat shorter than the arm 54. The cross-bar 53 extends transversely between the vertical flanges of the longitudinal bars 41, 42 of the intermediate frame, and the adjoining ends of the latch arms 54, 55 are connected by pivots 56 with said flanges, so that the latch arms may have an up and down pivotal movement imparted thereto. This arrangement will locate the latch arms 54, 55 in between the vertical flanges of the longitudinal bars 41, 42, with the outer extremity of the arm 54 in proximity to and above the vertical flange of the adjacent end bar 44 and the outer extremity of the latch arm 55 in proximity to and above the vertical flange of the adjacent end bar 21 of the auxiliary bed frame.

The end bar 21 which is adjacent to the locking means 52 is provided with recesses 58, 59 which are formed by notches in the vertical flange of the adjacent end bar 21, said recesses being properly spaced apart as shown more clearly in Figs. 5 and 6. The recess 59 is located just in advance of the stop 50 and the recess 58 is forward thereof in the adjacent end bar 21, for the purpose of enabling the latch arm 55 to be selectively engaged therein. A brace rod 60 preferably connects the latch arms 54, 55, and a handle 61 extends outwardly from the cross-bar 53, so that the locking means may be manually operated at will.

From the above described construction of the shiftable end bars 43, 44 and concomitant parts and which bars are herein illustrated as portions of the intermediate frame 20, the manner of converting the couch day bed into a double bed or into twin beds will be apparent. Fig. 4 illustrates enough of the parts to make it clear that when the auxiliary bed frame is pushed into the space of the main bed frame 10 for receiving it, that the intermediate end bars 43, 44 of the frame 20 will also be pushed in towards the back of the main frame. In Fig. 4 the locking means has been omitted for the sake of clearness of illustration. If the couch day bed is to be converted into a double bed with the auxiliary bed frame directly adjacent the front side of the main bed frame, the front finishing board 23 is taken hold of and sufficient pull exerted thereon to slide the auxiliary bed frame out from underneath the main frame. This movement will carry the intermediate frame or carriage 20 and hence the end bars 43, 44 forwardly until the stops 49 on the intermediate main frame strike the abutment portions 48, as shown in Figs. 3 and 6, and the intermediate frame can move out no further and is maintained in connected relation with the main bed frame. A somewhat further forward pull on the auxiliary bed frame is intended to position the recess 58 underneath the latch arm 55 which may then engage therein. It should be stated that in thus moving the auxiliary bed frame forwardly the locking means should first be thrown back inwardly and thus be raised so that the latch arm 54 and the handle 61 may clear the adjacent front upright 12 of the main frame. When said upright 12 has been cleared, the depression of the locking means will locate the outer extremity of the latch arm 54 just in advance of the abutment portion 48 of said upright 12, so that the bars 43, 44 of the intermediate frame or carriage are held against inward movement, the stops 49 holding them against outward movement. The described position of the parts having been obtained, with the latch arm 55 in engagement with the recess 58, the raising mechanism of the spring and mattress section E may be operated to elevate said section, and to bring the springs and mattress thereof alongside of the springs and mattress of the main bed frame, so as to form a double bed.

To enable the conversion of the improved couch day bed or bed structure into twin beds suitably spaced apart, the intermediate frame 20 and the auxiliary bed frame are moved to the positions shown in Figures 3 and 6, and if the recess 58 in the bottom frame portion of the latter is engaged by the latch arm 55, the arm is released from said recess and the auxiliary bed frame may be pulled out to the position shown in Figs. 1 and 2. This will bring the stops 50 into engagement with the abutment pins 51 of the intermediate frame, as shown more clearly in Fig. 5, and when the latch arm 54 is moved into engagement with the abutment portion 48 and the latch arm 55 into engagement with the recess 59, the auxiliary bed frame is locked against inward movement, in its outermost position, the intermediate frame or carriage 20 being held and locked against both inward or outward movement by means of the latch arm 54 and the stops 49 which are respectively located at the opposite sides of the vertical flange of the front upright bar 12 of the main frame.

Thus the improved bed structure may be converted into a structure comprising twin beds suitably spaced apart at S (Fig. 2) and practically isolating one of the beds from the other, and in fact enabling each bed to be made up with bed clothing and pillows just the same as if each were entirely independent and disconnected bed. In the twin bed position it is possible with care for a person to move between the two beds, by stepping into the spaces provided between the parts of the intermediate frame or carriage which lies low in its function of connecting the two beds. When the intermediate frame or carriage 20 is locked in its forward position with respect to the main bed frame it furnishes a reliable and convenient extension support for the rear portion of the auxiliary bed frame, and when the latter is locked in its extreme forward position to the intermediate frame or carriage, the entire twin bed structure is sufficiently rigid and satisfactory in use. By collapsing the crossed bars 26, 27, the mattress section E may be lowered and by unlocking the locked assembly of parts, they may be pushed into the storage space provided within the main bed frame.

It is desirable to provide in the improved bed structure suitable equalizing means such that when one person takes hold of the front board 23 at any point thereof and pulls on the same, the extension or auxiliary bed frame may be pulled out or pushed in without causing binding between the movable parts and the main frame of the bed structure. The equalizing means shown in Fig. 1 may comprise two pairs of links 62, 63 and 64, 65 which are connected by pivots 66 to the ends of a longitudinally movable bar 72, the outer ends of the links being pivoted in pairs 62, 65 and 63, 64, respectively, to a stationary back bar 13 of the main frame and front bar 42 of the movable intermediate frame 20. A similar equalizer is provided comprising pairs of links 67, 68 and 69, 70, together with longitudinal bar 73 connected with the inner ends of the links by pivots 71, the outer ends of the links 67, 70 being pivoted to the rear longitudinal bar 41 of the intermediate frame 20 and the forward ends of the links 68, 69 pivoted to the longitudinal bar 24 of the extension or auxiliary frame. The links 67, 68, 69, 70 and 73 not only act as an equalizer, but serve to secure the frame 20 and the extension bed frame together. In order that the equalizers may be clear of each other, the rear equalizer is supported above its supporting bars and the forward equalizer below the supporting bars. It will be seen that by the rear equalizer the movable frame 20 is kept parallel with the main frame 10 and that by the forward equalizer the extension or auxiliary frame is kept parallel with the intermediate frame 20. In this connection it can be stated that thus means are in a suitable way provided for causing the bars 43, 44 to move parallel with the end bars of the two bed frames.

It should be stated that in pulling out the slidable bed to the position shown in Fig. 3, the rear equalizer is the one first to expand, as its parts are held loosely together. The friction between the supports for the front equalizer and the links of such equalizer does not allow said equalizer to then expand, and hence the slidable bed and the end bars 43, 44 of the intermediate frame are moved forward together, as previously herein explained, inasmuch as the links of such equalizer secure these movable portions of the bed together. However, when the slidable bed is further pulled out to the twin bed position, shown in Fig. 4, the front equalizer expands and permits such movement, because the friction of the parts thereof is then overcome.

It is obvious that the invention is susceptible to modification as parts may be omitted, added and substituted without departing from the spirit of the invention as defined in the appended claims.

For example, it will be clear to those skilled in the art that, inasmuch as one of the bed frames telescopes with the other for converting the bed structure into a single bed, couch or sofa, or for extension, the relative positions of the two bed frames or sections may be reversed, that is to say, by using substantially the mechanical and functional equivalent of the interconnecting means between the two bed frames, the collapsible bed frame or section may remain in situ while the other bed frame or section may be moved relatively thereto in order to convert the bed structure into a double bed or into substantially spaced apart twin beds. In other words, under the present invention there are included two telescoping or nesting bed frames, one of which may serve as a stationary frame, while the other serves as the slidable frame, the two bed frames being connected by intermediate bars which may have a movement inwardly or outwardly of the stationary bed frame, the other or slidable bed frame being releasably connected with the said bars for movement relatively thereto, whereby such other bed frame may be adjusted to either double bed or twin bed position, and the intermediate bars and the thus positionable bed frame may be moved together, when the mattress section is lowered as one of the bed frames, with a range of movement sufficient to convert the two bed frames into a single bed for use as a couch or sofa.

What we claim as new, is:

1. In a bed structure, the combination of a main bed frame, an auxiliary bed frame movable outwardly and inwardly thereof and including a bottom frame and superposed, elevating, mattress frame, and connecting means between the main frame and the bottom frame and which connecting means are movable into the main frame, and the auxiliary frame movable relatively to the connecting means, and also, when in a collapsed position, into the main frame, whereby both the auxiliary frame and the connecting means are positionable below the mattress supporting parts of the main frame, and such connecting means provided with devices for selectively locking the auxiliary bed frame in two positions, namely, in a position directly adjoining the main frame so as to provide a double bed and in spaced relation to the main frame to provide isolated twin beds, the connecting means having an independent support from the floor and lying low down so as to leave an entirely free and unobstructed space thereabove when the bed structure is converted into twin beds, and the auxiliary bottom frame having a floor support independent of the floor support for the connecting means.

2. In a bed structure, the combination of a main bed frame, an auxiliary bed frame movable outwardly and inwardly thereof, means supported independently from the floor and connecting the two frames, and locking devices between the auxiliary bed frame and the connecting means for selectively locking the auxiliary bed frame in two positions, namely, in a position directly adjoining the main frame so as to provide a double bed, and in spaced relation to the main frame to provide isolated twin beds, and the auxiliary frame having a floor support independent of the floor support for the connecting means.

3. In a bed structure, the combination of a main bed frame, an auxiliary bed frame having an elevating mattress section, and an intermediate frame movable inwardly and outwardly of the main frame, and connecting the two frames, the auxiliary bed frame slidably connected with the intermediate frame, whereby the auxiliary bed frame may be adjusted to a position directly adjoining the main frame so as to provide a double bed, and in spaced relation to the main frame to provide isolated twin beds, and the intermediate frame and the auxiliary bed frame may be moved together into the main frame when the mattress section is lowered.

4. In a bed structure, the combination of a main bed frame, an auxiliary bed frame having an elevating mattress section, and an intermediate frame movable on casters inwardly and outwardly of the main frame, and connecting the two frames, the auxiliary bed frame supported at its rear portion by, and slidably connected with the intermediate frame, whereby the auxiliary bed frame may be adjusted to a position directly adjoining the main frame so as to provide a double bed and in spaced relation to the main frame to provide isolated twin beds, and the intermediate frame and the auxiliary bed frame may be moved together into the main frame when the mattress section is lowered.

5. In a bed structure, the combination of a main bed frame, an auxiliary bed frame having an elevating mattress section, and an intermediate frame movable on casters inwardly and outwardly of the main frame, and connecting the two frames, the auxiliary bed frame supported at its rear portion by, and slidably connected with, the intermediate frame, whereby the auxiliary bed frame may be adjusted to a position directly adjoining the main frame so as to provide a double bed, and in spaced relation to the main frame to provide isolated twin beds, and the intermediate frame and the auxiliary bed frame may be moved together into the main frame when the mattress section is lowered, and locking devices for maintaining the auxiliary bed frame in the adjoining and spaced positions specified.

6. In a bed structure, the combination of a main bed frame, an auxiliary bed frame having an elevating mattress section, an intermediate frame movable inwardly and outwardly of the main frame, and connecting the two frames, stops for limiting the outward movement of the intermediate frame, and means for securing the intermediate frame against inward movement when in its outer position, the auxiliary bed frame slidably connected with the intermediate frame, whereby the auxiliary bed frame may be adjusted to a position directly adjoining the main frame so as to provide a double bed, and in spaced relation to the main frame to provide isolated twin beds, and the intermediate frame and the auxiliary bed frame may be moved together into the main frame when the mattress section is lowered.

7. In a bed structure, the combination of a main bed frame, an auxiliary bed frame having an elevating mattress section, an intermediate frame movable inwardly and outwardly of the main frame, and connecting the two frames, the auxiliary bed frame slidably connected with the intermediate frame, whereby the auxiliary bed frame may be adjusted to a position directly adjoining the main frame so as to provide a double bed, and in spaced relation to the main frame to provide isolated twin beds, and the intermediate frame and the auxiliary bed frame may be moved together into the main frame when the mattress section is lowered, one end portion of the auxiliary bed frame having spaced recesses, and a manually operable latch mounted on the intermediate frame for engaging either recess so as to maintain the auxiliary bed frame in one or the other adjusted positions specified.

8. In a bed structure, the combination of a main bed frame, an auxiliary bed frame having an elevating mattress section, an intermediate frame movable inwardly and outwardly of the main frame, and connecting the two frames, the intermediate frame having end bars forming guides and the auxiliary bed frame slidably mounted on the end bars, whereby the auxiliary bed frame may be adjusted to a position directly adjoining the main frame so as to provide a double bed, and in spaced relation to the main frame to provide isolated twin beds, and the intermediate frame and the auxiliary bed frame may be moved together into the main frame when the mattress section is lowered.

9. In a bed structure, the combination of a main bed frame, an auxiliary bed frame having an elevating mattress section, an intermediate frame movable inwardly and outwardly of the main frame, and connecting the two frames, the auxiliary bed frame slidably connected with the intermediate frame, whereby the auxiliary bed frame may be adjusted to a position directly adjoining the main frame so as to provide a double bed, and in spaced relation to the main frame to provide isolated twin beds, and the intermediate frame and the auxiliary bed frame may be moved together into the main frame when the mattress section is lowered, and locking means comprising latches movably mounted on the intermediate frame, one for engaging a portion of the main bed frame and another for engaging a portion of the auxiliary bed frame.

10. In a bed structure, the combination of a main bed frame, an auxiliary bed frame having an elevating mattress section, an intermediate frame movable inwardly and outwardly of the main frame, and connecting the two frames, the auxiliary bed frame slidably connected with the intermediate frame, whereby the auxiliary bed frame may be adjusted to a position directly adjoining the main frame so as to provide a double bed, and in spaced relation to the main frame to provide isolated twin beds, and the intermediate frame and the auxiliary bed frame may be moved together into the main frame when the mattress section is lowered, and locking means comprising two latches, a pivot connecting the latches and journaled in the intermediate frame, one of said latches being longer than the other for engaging a portion of the main bed frame and the shorter latch for engaging a portion of the auxiliary frame.

11. In a bed structure, the combination of a main bed frame, an auxiliary bed frame having an elevating mattress section, an intermediate frame movable inwardly and outwardly of the main frame, and connecting the two frames, the auxiliary bed frame slidably connected with the intermediate frame, whereby the auxiliary bed frame may be adjusted to a position directly adjoining the main frame so as to provide a double bed, and in spaced relation to the main frame to provide isolated twin beds, and the intermediate frame and the auxiliary bed frame may be moved together into the main frame when the mattress section is lowered, and separate equalizers connecting the intermediate frame with the main bed frame and the auxiliary bed frame respectively.

12. In a bed structure, the combination of a main bed frame, an auxiliary bed frame having an elevating mattress section, an intermediate frame movable inwardly and outwardly of the main frame, and connecting the two frames, the auxiliary bed frame slidably connected with the intermediate frame, whereby the auxiliary bed frame may be adjusted to a position directly adjoining the main frame so as to provide a double bed, and in spaced relation to the main frame to provide isolated twin beds, and the intermediate frame and the auxiliary bed frame may be moved together into the main frame when the mattress section is lowered, an equalizer connecting the main bed frame with a front portion of the intermediate frame, and another equalizer connecting the auxiliary bed frame with a rear portion of the intermediate frame.

13. In a bed structure, the combination of spaced apart twin beds, one collapsible and slidable into the other bed, and an intermediate frame connecting the beds and also slidable into the other bed with a movement relatively to the collapsible bed, such frame independently resting on the floor and providing a carriage for supporting the inner portion of the collapsible bed, the collapsible bed having at its outer portion means for supporting it from the floor independently of the intermediate frame.

14. In a bed structure, the combination of spaced apart twin beds, one collapsible and slidable into the other bed, an intermediate frame connecting the beds and also slidable into the other bed with a movement relatively to the collapsible bed, such frame extending from end to end of the bed structure and providing a carriage for supporting from the floor the inner portion of the collapsible bed, the collapsible bed having at its outer portion means for supporting it from the floor independently of the intermediate frame, and locking devices for securing the intermediate frame and the collapsible bed against movement from their extreme outer positions.

15. In a bed structure, the combination of twin beds, means for collapsing one of the beds, a spacing frame for disposing the beds for use as single beds or twin beds, means connecting the spacing frame and the collapsible bed for relative horizontal movements, means connecting the collapsible bed and the spacing frame with the other bed for relative horizontal movements with respect to the other bed, and individual supporting means for the spacing frame and each bed whereby to provide an independent support from the floor for each of the single beds and the spacing frame.

16. In a bed structure, the combination of two telescoping bed frames, one frame to remain in situ and the other movable outwardly and inwardly thereof, and one of the frames having an elevating mattress section, and movable connecting means between the two frames, such means connecting the two frames for two predetermined positions of the movable frame outwardly relatively to the stationary frame, means for securing together the connecting means and the movable frame for effectuating simultaneous outward movement, stop means associated with the connecting means and one of the frames for defining a position of the movable frame directly adjoining the stationary frame when the movable frame is pulled out so as to provide a double bed, and means providing for a movement of the movable frame forward relatively to the double bed position, to enable the movable frame to be moved a greater distance so as to be in substantial spaced relation to the stationary frame and thereby provide isolated twin beds.

17. In a bed structure, the combination of a main bed frame, an auxiliary bed frame having an elevating mattress section, and intermediate bars arranged transversely between and connecting the two frames, and movable inwardly and outwardly of one of the bed frames, the intermediate bars forming guides and the other bed frame slidably connected with the guide portions of the bars, whereby such other bed frame may be adjusted to a position directly adjoining the said one frame so as to provide a double bed, and in spaced relation to said one frame to provide isolated twin beds, and the intermediate bars and the thus positionable bed frame may be moved together, when the mattress section is lowered, with a range of movement sufficient to convert the two bed frames into a single bed.

18. In a bed structure, the combination of two telescoping bed frames, one frame to remain in situ and the other movable outwardly and inwardly thereof, and one of the frames having a movable mattress section, and longitudinally movable connecting bars between the two frames, such bars connecting the two frames for two predetermined positions of the movable frame outwardly relatively to the stationary frame, means for securing together the connecting bars and the movable frame for effectuating simultaneous outward movement, stop means associated with the connecting bars and the stationary frame for defining a position of the movable frame directly adjoining the stationary frame when the movable frame is pulled out so as to provide a double bed, providing for a movement of the movable frame forward relatively to the stopped position of the connecting bars when the beds are in double bed position, to enable the movable frame to be moved a greater distance so as to be in spaced relation to the stationary frame and thereby provide isolated twin beds, and means for latching the connecting bars and the outwardly movable frame against outward movement of the movable frame when it is in double bed position.

19. In a bed structure, the combination of a main bed frame, an auxiliary bed frame having an elevating mattress section, and intermediate bars arranged transversely between and connecting the two frames, and movable inwardly and outwardly of one of the bed frames, the intermediate bars forming guides and the other bed frame slidably connected with the guide portions of the bars, and means for releasably connecting the bars with the other frame for effectuating simultaneous movement with the said other frame and providing for the independent movement of said other frame, whereby such other bed frame may be adjusted to a position directly adjoining the said one frame so as to provide a double bed, and in spaced relation to said one frame to provide isolated twin beds, and the intermediate bars and the thus positionable bed frame may be moved together, when the mattress section is lowered, with a range of movement sufficient to convert the two bed frames into a single bed.

20. In a bed structure, the combination of a main bed frame, an auxiliary bed frame having an elevating mattress section, and intermediate bars arranged between and connecting the two frames, and the bars movable inwardly and outwardly of one of the bed frames, and enabling the other bed frame to be adjusted outwardly to a position directly adjoining the said one frame so as to provide a double bed, and means by which such other bed frame is releasable from the intermediate bars for a further outward movement of such frame, the bars also connecting the two frames during such further movement, whereby such other bed frame may be adjusted in spaced relation to said one frame to provide isolated twin beds, the intermediate bars and the thus positionable bed frame being movable together inwardly, when the mattress section is lowered, with a range of movement sufficient to convert the two bed frames into a single bed.

21. In a bed structure, the combination of a main bed frame, an auxiliary bed frame having an elevating mattress section, and intermediate bars arranged transversely between and connecting the two frames, and the bars movable inwardly and outwardly of one of the bed frames, and enabling the other bed frame to be adjusted outwardly to a position directly adjoining the said one frame so as to provide a double bed, stops for limiting the outward movement of the intermediate bars, and means by which such other bed frame is releasable from the intermediate bars for a further outward movement of such frame, the bars also connecting the two frames during such further movement, whereby such other bed frame may be adjusted in spaced relation to said one frame to provide isolated twin beds, and means associated with the bars and such other frame to limit its movement to twin bed position, the intermediate bars and the thus positionable bed frame being movable together inwardly, when the mattress section is lowered, with a range of movement sufficient to convert the two bed frames into a single bed.

22. In a bed structure, the combination of a main bed frame, an auxiliary bed frame, intermediate bars arranged between and connecting the two frames, and the bars movable inwardly and outwardly of one of the bed frames, and enabling the other bed frame in one movement to be adjusted outwardly to a position directly adjoining the said one frame so as to provide a double bed, and means by which such other bed frame is releasable from the intermediate bars, for a further outward movement of such frame relatively to the bars and in spaced relation to said one frame to provide isolated twin beds, the intermediate bars and the thus positionable bed frame being movable together inwardly with a range of movement sufficient to convert the two bed frames into a single bed.

23. In a bed structure, the combination of a main bed frame, an auxiliary bed frame, intermediate bars arranged transversely between and connecting the two frames, and the bars movable inwardly and outwardly of one of the bed frames, and enabling the other bed frame to be adjusted outwardly to a position directly adjoining the said one frame so as to provide a double bed, stops for limiting the outward movement of the intermediate bars, and means by which such other bed frame is releasable from the intermediate bars, for a further outward movement of such frame relatively to the bars and in spaced relation to said one frame to provide isolated twin beds, and means associated with the bars and such other frame to limit its movement to twin bed position, the intermediate bars and the thus positionable bed frame being movable together inwardly with a range of movement sufficient to convert the two bed frames into a single bed.

24. In a bed structure, the combination of a main bed frame, a second bed frame, a carrier disposed intermediately of the two frames for associating them in operative relation, the carrier movable inwardly and outwardly relatively to one of the frames and also movable with the other frame, to enable the other frame in one movement to be shifted outwardly to a position directly adjoining such one frame so as to provide a double bed when the carrier is adjacent the front of such one frame, and releasable means between the other frame and the carrier permitting a movement outwardly of such other frame relatively to both the carrier and such one frame and in spaced relation to such one frame to provide isolated twin beds, the carrier and the thus positionable frame being movable together inwardly from double bed position towards the rear portion of such one frame with a range of movement suffiicient to convert the two bed frames into a single bed.

BENJAMIN M. FRANK.
JOSEPH BASILE.

CERTIFICATE OF CORRECTION.

Reissue No. 18,725. January 31, 1933.

BENJAMIN M. FRANK, ET AL.

It is hereby certified that error appears in the printed specification of the above numbered patent requiring correction as follows: Page 7, line 130, claim 18, before "providing" insert the word "means"; and that the said Letters Patent should be read with this correction therein that the same may conform to the record of the case in the Patent Office.

Signed and sealed this 25th day of April, A. D. 1933.

M. J. Moore.

(Seal) Acting Commissioner of Patents.